United States Patent
Kurabayashi et al.

(10) Patent No.: US 8,660,679 B2
(45) Date of Patent: Feb. 25, 2014

(54) AUGMENTED REALITY SYSTEM

(75) Inventors: Shuichi Kurabayashi, Fujisawa (JP); Naofumi Yoshida, Yokohama (JP); Kosuke Takano, Fujisawa (JP)

(73) Assignee: Empire Technology Development LLC, Wilmington, DE (US)

( * ) Notice: Subject to any disclaimer, the term of this patent is extended or adjusted under 35 U.S.C. 154(b) by 252 days.

(21) Appl. No.: 13/139,819

(22) PCT Filed: Dec. 2, 2010

(86) PCT No.: PCT/US2010/058675
§ 371 (c)(1),
(2), (4) Date: Jun. 15, 2011

(87) PCT Pub. No.: WO2012/074528
PCT Pub. Date: Jun. 7, 2012

(65) Prior Publication Data
US 2012/0143361 A1    Jun. 7, 2012

(51) Int. Cl.
*G06F 17/00* (2006.01)

(52) U.S. Cl.
USPC ............................................. 700/94; 715/757

(58) Field of Classification Search
USPC ............ 715/201; 348/25, 116, 142, 462, 586, 348/600
See application file for complete search history.

(56) References Cited

U.S. PATENT DOCUMENTS

| | | | |
|---|---|---|---|
| 6,741,883 B2 | 5/2004 | Gildenberg | |
| 7,065,222 B2 | 6/2006 | Wilcock | |
| 7,792,674 B2 * | 9/2010 | Dalton et al. | 704/270 |
| 2004/0104935 A1 * | 6/2004 | Williamson et al. | 345/757 |
| 2005/0281410 A1 * | 12/2005 | Grosvenor et al. | 381/61 |
| 2007/0140532 A1 * | 6/2007 | Goffin | 382/118 |
| 2009/0237492 A1 | 9/2009 | Kikinis et al. | |
| 2010/0045869 A1 * | 2/2010 | Baseley et al. | 348/598 |
| 2010/0151946 A1 * | 6/2010 | Wilson et al. | 463/36 |
| 2011/0088535 A1 * | 4/2011 | Zarimis | 84/645 |
| 2011/0098056 A1 * | 4/2011 | Rhoads et al. | 455/456.1 |
| 2011/0111849 A1 * | 5/2011 | Sprague et al. | 463/31 |
| 2012/0165046 A1 * | 6/2012 | Rhoads et al. | 455/456.3 |

OTHER PUBLICATIONS

Audio Spotlight, Holosonic Research Labs, Inc., at http://www.holosonics,com, Accessed May 26, 2011, 2 pages.

Heller et al., "Multi-User Interaction in Virtual Audio Spaces", The Proceedings of the 27$^{th}$ International Conference Extended Abstracts on Human Factors in Computing Systems (Boston, MA, USA, Apr. 4-9, 2009), CHI EA '09, ACM, NY, NY, 4489-4494, http://doi.acm.org/10.1145/1520340.1520688.

International Patent Application No. PCT/US2010/058675: International Search Report Dated Apr. 26, 2011, 8 pages.

(Continued)

*Primary Examiner* — Andrew C Flanders
*Assistant Examiner* — David Siegel
(74) *Attorney, Agent, or Firm* — Woodcock Washburn LLP

(57) ABSTRACT

Technologies are generally described for a system for processing an augmented reality image. In some examples, an augmented reality system may include an augmented reality engine configured to provide an augmented reality image by integrating a real-world image and a virtual object, and a message processing unit configured to receive a message related to the virtual object and to translate spatial attributes of the virtual object into audio attributes of a sound file.

23 Claims, 10 Drawing Sheets

(56) References Cited

OTHER PUBLICATIONS

Klein and Murray, "Parallel Tracking and Mapping for Small AR Workspaces", Mixed and Augmented Reality, 2007, ISMAR 2007, 6$^{th}$ IEEE and ACM International Symposium, Nov. 13-16, 2007, 225-234, http://ieeexplor.ieee.org/stamp/stamp.isp?arnumber.4538852cisnumber=4538818.

Kokodake, (Kokodake is a Japanese word meaning "For Your Ears Only"), Mitsubishi Electric Engineering Co., Ltd., at http://www.mee.co.ip/sales/acoustics/kokodake, Accessed May 26, 2011, 7 pages.

Lee and Höllerer, "Handy AR: Markerless Inspection of Augmented Reality Objects Using Fingertip Tracking", Mar. 21, 2009, 2 pages, http://ilab.cs.ucsb.edu/projects/taehee/handyar/handyar.html.

Owen et al., "Display-Relative Calibration for Optical See-Through Head-Mounted Displays", Proceedings of the 3$^{rd}$ IEEE/ACM International Symposium on Mixed and Augmented Reality, IEEE Computer Society, Wash., DC, Nov. 2-5, 2004, 70-78, http://dx.doi.org/10.1109/ISMAR.2004.28.

Sekai Camera, Tonchidot Corporation, Product Information, at http://www.tonchidot.com/product-info.html, Accessed May 19, 2009, 8 pages.

SREngine Corporation, at http://wwwsrengine.com, Accessed May 26, 2011, 10 pages.

\* cited by examiner

| AUDIO / SPATIAL | TONE(t) | PICTH(p) | VOLUME(v) |
|---|---|---|---|
| X | $t = f_1(x)$ | $p = f_2(x)$ | $v = f_3(x)$ |
| Y | $t = f_4(y)$ | $p = f_5(y)$ | $v = f_6(y)$ |
| Z | $t = f_7(z)$ | $p = f_8(z)$ | $v = f_9(z)$ |

| X | Y | Z | TONE | PICTH | VOLUME |
|---|---|---|------|-------|--------|
| 1 | 1 | 1 | 1 | 1 | 1 |
| 1 | 1 | 2 | 1 | 1 | 2 |
| 1 | 1 | 3 | 1 | 1 | 3 |
| 1 | 1 | 4 | 1 | 1 | 4 |
| ⋮ | ⋮ | ⋮ | ⋮ | ⋮ | ⋮ |

(unit : cm)

AUGMENTED REALITY SYSTEM

CROSS-REFERENCE TO RELATED APPLICATIONS

This application is the National Stage of International Application No. PCT/US2010/058675, filed Dec. 2, 2010, the disclosure of which is incorporated herein by reference in its entirety.

BACKGROUND

Augmented reality (AR) focuses on combining real world and computer-generated data, especially computer graphics objects blended into real footage in real time for display to an end-user. The scope of AR has expanded to include non-visual augmentation and broader application areas, such as advertising, navigation, and entertainment to name a few. There is increasing interest in providing seamless integration of such computer-generated data, including images and non-visual augmentation data, into real-world scenes.

SUMMARY

In an example, an augmented reality system may include an augmented reality engine configured to provide an augmented reality image by integrating a real-world image, and a virtual object and a message processing unit configured to receive a message related to the virtual object and to translate spatial attributes of the virtual object into audio attributes of a sound file.

In an example, a method performed under the control of an augmented reality system may include receiving a message related to a virtual object and translating spatial attributes of the virtual object into audio attributes of a sound file.

In an example, a computer-readable storage medium may include contents that cause a processor to receive a message related to a virtual object and to translate spatial attributes of the virtual object into audio attributes of a sound file.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

FIG. 6 shows an illustrative example of a sound mapping table;

FIG. 8 shows an illustrative example of a sound mapping table;

Figure 1:
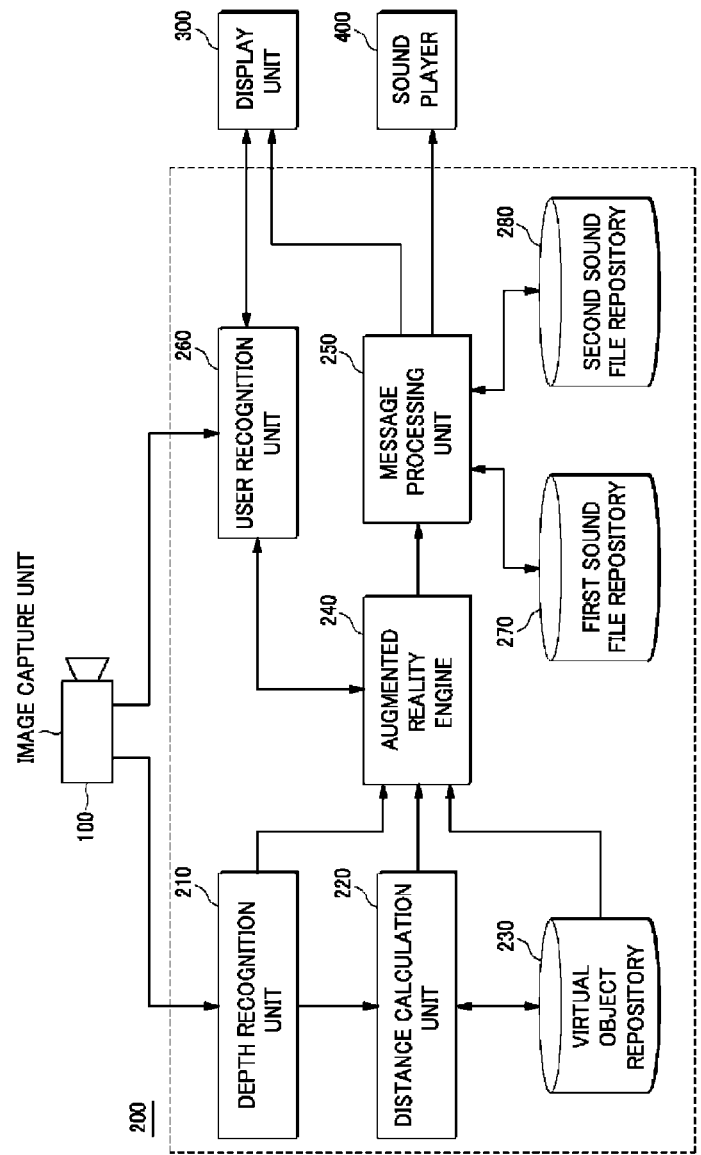
FIG. 1 shows a schematic block diagram of an illustrative example of an augmented reality system.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

This disclosure is generally drawn, inter alia, to methods, apparatus, systems, devices, and computer program products related to augmented reality.

Briefly stated, technologies are generally described for a system for processing an augmented reality image. In some examples, the system may include an image capture unit to capture a real-world image. In some examples, the system may include a virtual object repository to store one or more virtual objects. In some examples, the system may include an augmented reality engine to provide an augmented reality image by integrating the real-world image and one or more of the virtual objects. In some examples, the system may include a message processing unit to receive a message related to one or more of the virtual objects and to translate spatial attributes of such one or more virtual objects.

FIG. 1 shows a schematic block diagram of an illustrative example of an augmented reality system in accordance with at least some embodiments described herein. The augmented reality system will be described below with reference to illustrative example images shown in FIGS. 2-5. Referring to FIG. 1, the augmented reality system may include an image capture unit 100, an augmented reality module 200, a display unit 300 and a sound player 400.

Figure 2:
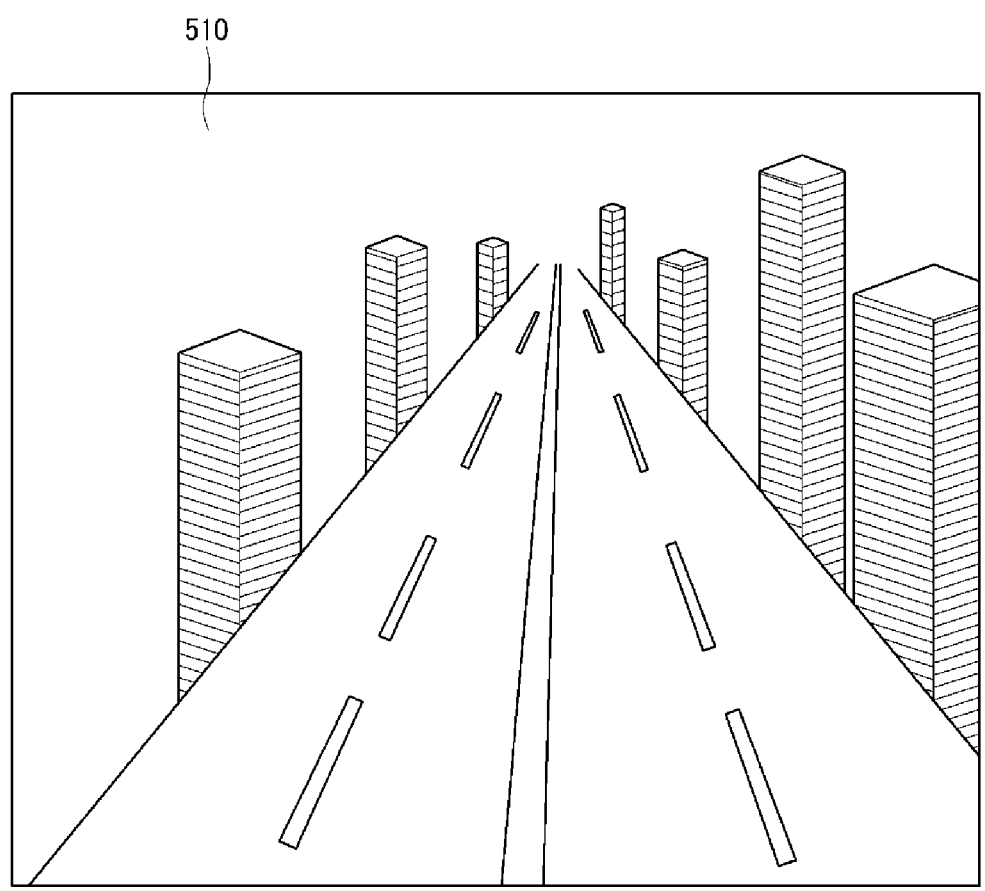
FIG. 2 shows an illustrative example of a real-world image to be processed by an augmented reality system.

Image capture unit 100 may capture one or more real-world images. By way of example, image capture unit 100 may capture a real-world image 510 as illustrated in FIG. 2 and provide the captured real-world image 510 to augmented reality module 200. Image capture unit 100 may include, but is not limited to, a digital camera, a camera embedded in a mobile device, a HMD (Head Mounted Display), an optical sensor, an electronic sensor, multiple such devices, or any combination thereof.

Augmented reality module 200 may include a depth recognition unit 210, a distance calculation unit 220, a virtual object repository 230, an augmented reality engine 240, a message processing unit 250, a user recognition unit 260, a first sound file repository 270, and a second sound file repository 280.

Depth recognition unit 210 may obtain spatial attributes of a real-world image that is captured by image capture unit 100. Depth recognition unit 210 may calculate x, y and z axes in real-world image 510 shown in FIG. 2 and obtain x, y and z coordinates of images or depictions of various real objects in real-world image 510. To obtain the x, y and z axes and the x, y and z coordinates of the images or depictions of the various real objects in real-world image 510, depth recognition unit 210 may use a location recognition algorithm. The location recognition algorithm may include, but is not limited to, the use of a Parallel Tracking and Mapping (PTAM) method (such as that described by Georg Klein and David Murray in "Parallel Tracking and Mapping for Small AR Workspaces," In Proc. International Symposium on Mixed and Augmented Reality, ISMAR'07, Nara) and/or a Simultaneous Localization and Mapping (SLAM) method. The location recognition algorithm used may be an algorithm that is well known in the art and may be implemented without the need for further explanation herein.

Distance calculation unit 220 may obtain a distance between a user and a virtual object (that is, the position of the virtual object relative to the user). Distance calculation unit 220 may use the x, y and z axes of real-world image 510 and the x, y and z coordinates of the images or depictions of the real objects therein to calculate the distance between the user and the virtual object and/or the position of the virtual object relative to the user. One or more virtual objects may be stored in virtual object repository 230 and arranged at positions within real-world image 510 corresponding to the x, y and z coordinates of the images or depictions of the real objects.

Distance calculation unit 220 may calculate a Euclidian metric between a user and a virtual object to obtain a distance between the user and the virtual object. The Euclidian metric may be a distance between two different points and may be expressed by the following Equation 1.

$$d(p, p') = \sum_{i=1}^{3} p_i p'_i \quad \text{(Equation 1)}$$

Here, p may denote one of the two different points and p' may denote the other of the two different points. p may have an x-axis coordinate x, a y-axis coordinate y, and a z-axis coordinate z, and may be expressed as p(x, y, z), and p' may have an x-axis coordinate x', a y-axis coordinate y', and a z-axis coordinate z', and may be expressed as p'(x', y', z'). To elaborate, Equation 1 may be expressed by the following Equation 2.

$$d(p,p') = \sqrt{(x-x')^2 + (y-y')^2 + (z-z')^2} \quad \text{(Equation 2)}$$

The distance between a user and a virtual object calculated by distance calculation unit 220 may be used when augmented reality engine 240 generates an augmented reality image.

Augmented reality engine 240 may provide an augmented reality image by integrating real-world image 510 and one or more of the virtual objects. By way of example, as illustrated in FIG. 3, augmented reality engine 240 may be configured to provide an augmented reality image 520 by integrating real-world image 510 and virtual objects 530 to 541 by using the x, y and z axes of real-world image 510 and the x, y and z coordinates of the images or depictions of the real objects therein.

Further, augmented reality engine 240 may integrate real-world image 510 and virtual objects 530 to 541 by using the distances between a user and the virtual objects 530 to 541. For example, some of virtual objects 530 to 541 at smaller (nearer) distances from the user may be displayed on augmented reality image 520 larger than others of virtual objects 530 to 541 at larger (further) distances from the user.

Figure 3:
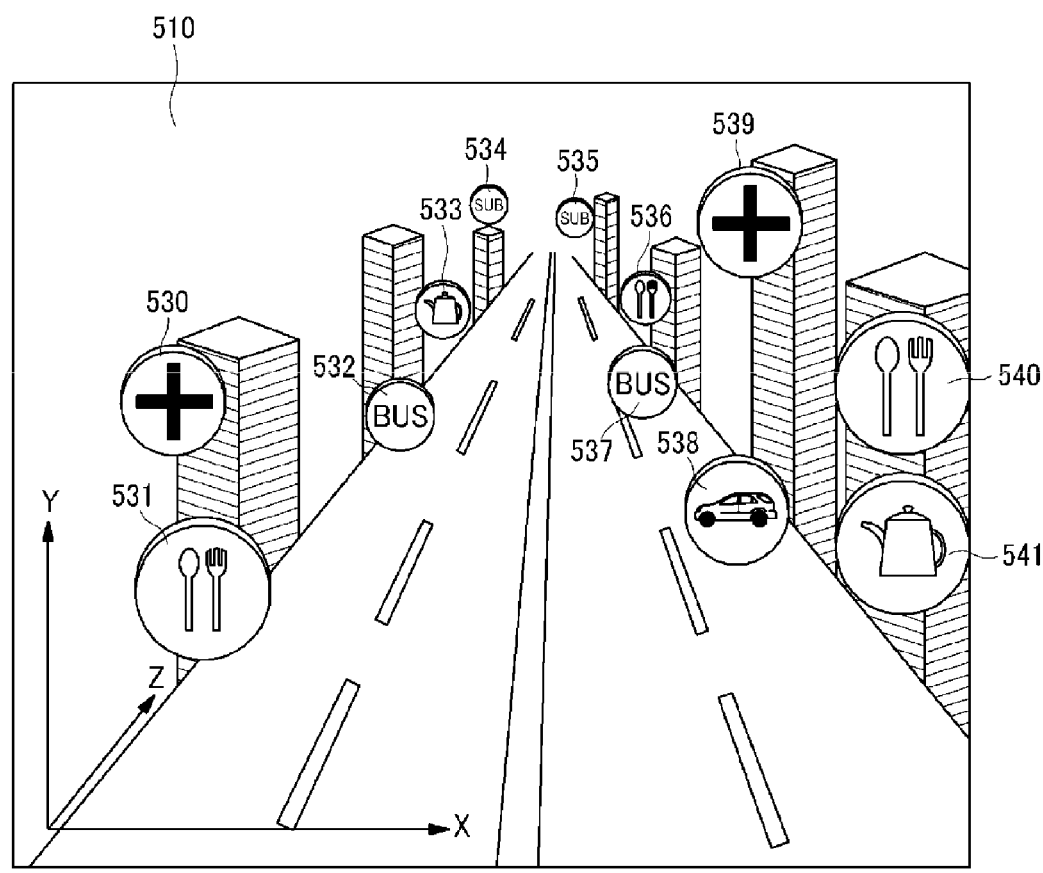
FIG. 3 shows an illustrative example of an augmented reality image generated by an augmented reality system.

Referring to FIG. 3, by way of example, virtual object 531 is displayed larger than virtual object 534 on augmented reality image 520. Accordingly, the user may be informed of the fact that a real object corresponding to virtual object 531 is located closer to the user than a real object corresponding to virtual object 534.

Message processing unit 250 may receive one or more messages related to virtual objects 530 to 541 displayed on augmented reality image 520 from augmented reality engine 240. Such messages may include at least two parts. One of the two parts may be a sound file and the other one of the two parts may be an entity such as, but not limited to, text data, graphical data, or numerical data. As described below, message processing unit 250 may translate spatial attributes of a virtual object, which may include a message, into audio attributes of a sound file which may be included in the message. Further, the sound file may be played by sound player 400 mentioned below.

The text data may include any information, including, but not limited to, an advertisement, a traffic report, directions, and a news report. Further, the graphical data may include a symbol or an icon such as a warning icon of "⚠." Furthermore, the numerical data may be x, y and z coordinates of virtual objects of an augmented reality image, and the x, y and z coordinates of the virtual objects may correspond to a location (x, y, z) of a user input which is a user selection of the virtual objects by touching, clicking, or drag-and-dropping the depiction of the virtual objects.

Messages may include active messages and passive messages. An active message may be a message that may be automatically delivered from virtual objects of an augmented reality image to a user, irrespective of the user selecting virtual objects by touching, clicking, or drag-and-dropping the depictions of the virtual objects. A passive message may be a message that may be delivered from virtual objects of an augmented reality image to a user as a response to the user selecting virtual objects by touching, clicking or drag-and-dropping the depictions of the virtual objects. A passive message may be generated by the user selecting a virtual object in order to inform the user that the augmented reality system is recognizing the user selection.

Active messages may be provided from virtual objects 530 to 541 and delivered to the user on augmented reality image 520. Virtual objects 530 to 541 including the active messages may be stored in virtual object repository 230. Further, passive messages may be generated based on a user input and delivered to the user on augmented reality image 520. By way of example, a passive message may be a response from one of virtual objects 530 to 541 in response to a user input related to virtual objects 530 to 541. Virtual objects 530 to 541 including associated passive messages may be stored in virtual object repository 230.

Although, in an embodiment, active and passive messages may be provided by virtual objects 530 to 541 and stored with such virtual objects in virtual object repository 230, in some embodiments active and passive messages may be associated with virtual objects 530 to 541 by augmented reality engine 240. For example, active and passive messages may be stored in a repository separate from virtual object repository 230. Augmented reality engine 240 may retrieve active and passive messages related to virtual objects 530 to 541 from the separate repository and combine them with virtual objects 530 to 541.

Figure 4:
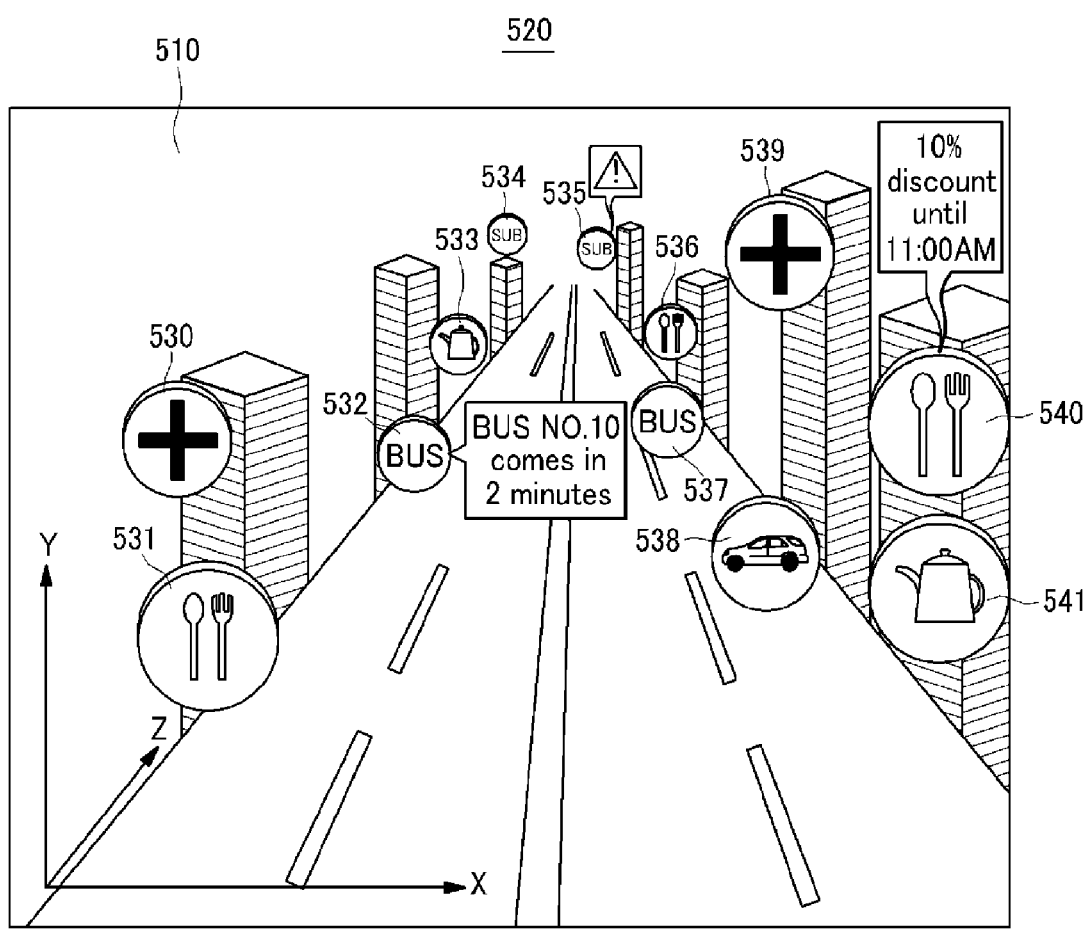
FIG. 4 shows an illustrative example of an augmented reality image including an active message.

Message processing unit 250 may receive augmented reality image 520 from augmented reality engine 240. In an embodiment, virtual objects 530 to 541 on augmented reality image 520 may include active messages. Message processing unit 250 may receive the active messages included in virtual objects 530 to 541 and display the received active messages on augmented reality image 520. For example, as illustrated in FIG. 4, message processing unit 250 may receive an active message, which may have entity data of text data such as "Bus No. 10 comes in 2 minutes" and may be included in virtual object 532, and display this message on augmented reality image 520. Further, message processing unit 250 may receive an active message, which may have entity data of text data such as "10% discount until 11:00 AM" and may be included in virtual object 540, and display this message on augmented reality image 520. Furthermore, message processing unit 250 may receive an active message, which may have entity data of graphical data such as "" and may be included in virtual object 535, and display this message on augmented reality image 520.

User recognition unit 260 may recognize user inputs related to virtual objects 530 to 541 on augmented reality image 520. By way of example, user recognition unit 260 may recognize user inputs related to virtual objects 530 to 541 on augmented reality image 520 displayed on display unit 300. For instance, user recognition unit 260 may recognize a user input made by touching display unit 300.

Moreover, user recognition unit 260 may recognize a user input captured by image capture unit 100 by using an algorithm such as, but not limited to, Handy Augmented Reality method (T. Lee and T. Höllerer. 2009. Multithreaded Hybrid Feature Tracking for Markerless Augmented Reality. IEEE Transactions on Visualization and Computer Graphics 15, 3 (May 2009), 355-368) for recognizing interaction between a finger tip of the user captured by a camera and virtual objects 530 to 541. Here, it will be apparent to those skilled in the art that user recognition unit 260 may use other algorithms for recognizing interaction between the user and virtual objects 530 to 541 than the Handy Augmented Reality method.

If the user inputs related to virtual objects 530 to 541 on augmented reality image 520 are inputted on display unit 300, passive messages may be generated from virtual objects 530 to 541. Further, if user inputs captured by image capture unit 100 are inputted on augmented reality image 520, the passive messages may be generated from virtual objects 530 to 541.

Referring back to the description of message processing unit 250, message processing unit 250 may receive augmented reality image 520 from augmented reality engine 240. Here, virtual objects 530 to 541 on augmented reality image 520 may include passive images. Message processing unit 250 may receive the passive messages included in virtual objects 530 to 541.

Figure 5:
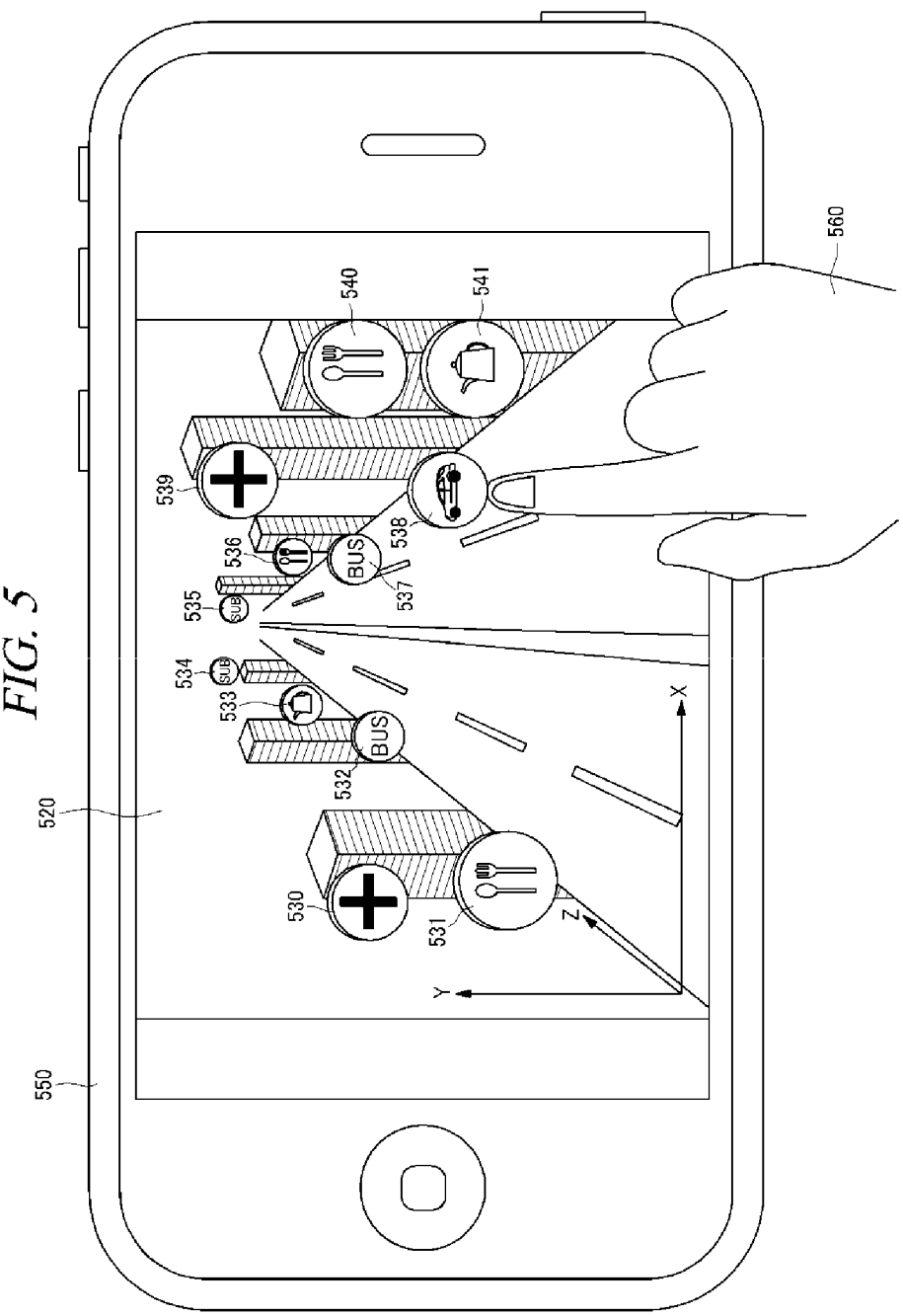
FIG. 5 shows an illustrative example of an augmented reality image including a passive message displayed on a mobile device.

By way of example, as illustrated in FIG. 5, a user 560 may make a user input related to virtual object 538 on augmented reality image 520 displayed on a mobile device 550. The user input may be a user selection of virtual object 538 by touching, clicking or drag-and-dropping the depiction of virtual object 538 on mobile device 550. User recognition unit 260 may recognize the user input from a screen of mobile device 550. Mobile device 550 shown in FIG. 5 may include, but is not limited to, a Personal Digital Assistant (PDA), a smart phone, a tablet computer, a personal computer, a laptop computer, a cellular phone, any type of wireless or wired communications device, and a Portable Multimedia Player (PMP), or any combination thereof. If the user input is made, a passive message which has numerical data such as x, y and z coordinates of virtual object 538 of augmented reality image 520 may be generated based on a location (x, y, z) of the user selection of virtual object 538. Then, message processing unit 250 may receive the passive message generated from virtual object 538. The passive message may be an internal data structure for communication between a user and virtual objects, and thus the passive message may not be displayed on the screen of mobile device 550.

In FIGS. 3 to 5, although twelve virtual objects 530 to 541 are displayed on augmented reality image 520, the number of virtual objects capable of being displayed on augmented reality image 520 may not be limited thereto. Further, although an x-axis, a y-axis, and a z-axis are shown on augmented reality image 520 in FIGS. 3 to 5, they may not be displayed on display unit 300. Moreover, although augmented reality image 520 is illustrated in FIG. 5 to be displayed by mobile device 550, a device for displaying augmented reality image 520 is not limited to mobile device 550.

Referring back to FIG. 1, message processing unit 250 may translate spatial attributes of a virtual object into audio attributes of a sound file. The spatial attributes may be obtained by depth recognition unit 210, as described herein. The spatial attributes may include a first spatial component, a second spatial component and a third spatial component. For example, the first spatial component may be an x-coordinate of a virtual object, the second spatial component may be a y-coordinate of the virtual object, and the third spatial component may a z-coordinate of the virtual object. The audio attributes of a sound file may include a first audio component, a second audio component, and a third audio component. By way of example, the first audio component may be a tone component of the sound file, the second audio component may be a pitch component of the sound file, and the third audio component may be a volume component of the sound file. In an embodiment, a tone component may be implemented through the use of sounds associated with various instruments. For example, a lower tone component may be indicated by a piano sound, while a higher tone component may be indicated by a violin sound. Any other means of indicating a tone component or any other sound or combination of sounds that may be associated with a tone component are contemplated as within the scope of the present disclosure.

Although the first, second, and third spatial components are described to be the x-coordinate, y-coordinate and z-coordinate, respectively, they are nothing more than an example and are not limited thereto. Furthermore, although the first, second, and third audio components may be described to be the tone, pitch and volume components, respectively, they are nothing more than an example and are not limited thereto.

Message processing unit 250 may translate a first spatial component, a second spatial component, and a third spatial component into a first audio component, a second audio component, and a third audio component, respectively. For example, message processing unit 250 may translate the x, y and z coordinates of a virtual object into tone, pitch and volume components of a sound file, respectively.

As described herein, however, because the x, y and z coordinates may not always be the first, second and third spatial components, respectively, and the tone, pitch and volume components may not always be the first, second and third audio components, respectively, the relationship for translation between the x, y and z coordinates and the tone, pitch and volume components may vary. For example, message processing unit 250 may translate the x, y and z coordinates of a virtual object into pitch, volume and tone components of a sound file, respectively. Further, message processing unit 250 may translate the x, y and z coordinates of a virtual object into volume, tone and pitch components of a sound file, respectively.

Message processing unit 250 may translate spatial attributes of a virtual object into audio attributes of a sound file by using a sound mapping table. The sound mapping table may include a functional formula indicating a relationship between the spatial attributes and the audio attributes.

FIG. 6 shows an illustrative example of a sound mapping table 600 in accordance with at least some embodiments described herein. As depicted in FIG. 6, sound mapping table 600 may include a functional formula that defines a relationship between each of the spatial components of the spatial attributes and each of the audio components of the audio attributes. By way of example, the relationship between the x-coordinate and the tone component may be defined by a functional formula of $t=f_1(x)$. Accordingly, by using the functional formula of $t=f_1(x)$, message processing unit 250 may translate the x-coordinate of the virtual object into the tone component of the sound file.

Likewise, the relationship between the x-coordinate and the pitch component may be defined by a functional formula of $p=f_2(x)$, and the relationship between the x-coordinate and the volume component may be defined by a functional formula of $v=f_3(x)$. Further, the relationship between the y-coordinate and the tone component may be defined by a functional formula of $t=f_4(y)$, the relationship between the y-coordinate and the pitch component may be defined by a functional formula of $p=f_5(y)$, and the relationship between the y-coordinate and the volume component may be defined by a functional formula of $v=f_6(y)$. Moreover, the relationship between the z-coordinate and the tone component may be defined by a functional formula of $t=f_7(z)$, the relationship between the z-coordinate and the pitch component may be defined by a functional formula of $p=f_8(z)$, and the relationship between the z-coordinate and the volume component may be defined by a functional formula of $v=f_9(z)$.

In FIG. 6, although sound mapping table 600 includes nine different functional formulas that define the relationship between each of the x, y and z coordinates and each of the tone, pitch and volume components, the number of the functional formulas may not be limited thereto. By way of example, the relationship between the x-coordinate and the tone component, the relationship between the x-coordinate and the pitch component, and the relationship between the x-coordinate and the volume component may be all defined by $f_1(x)$.

Figure 7:
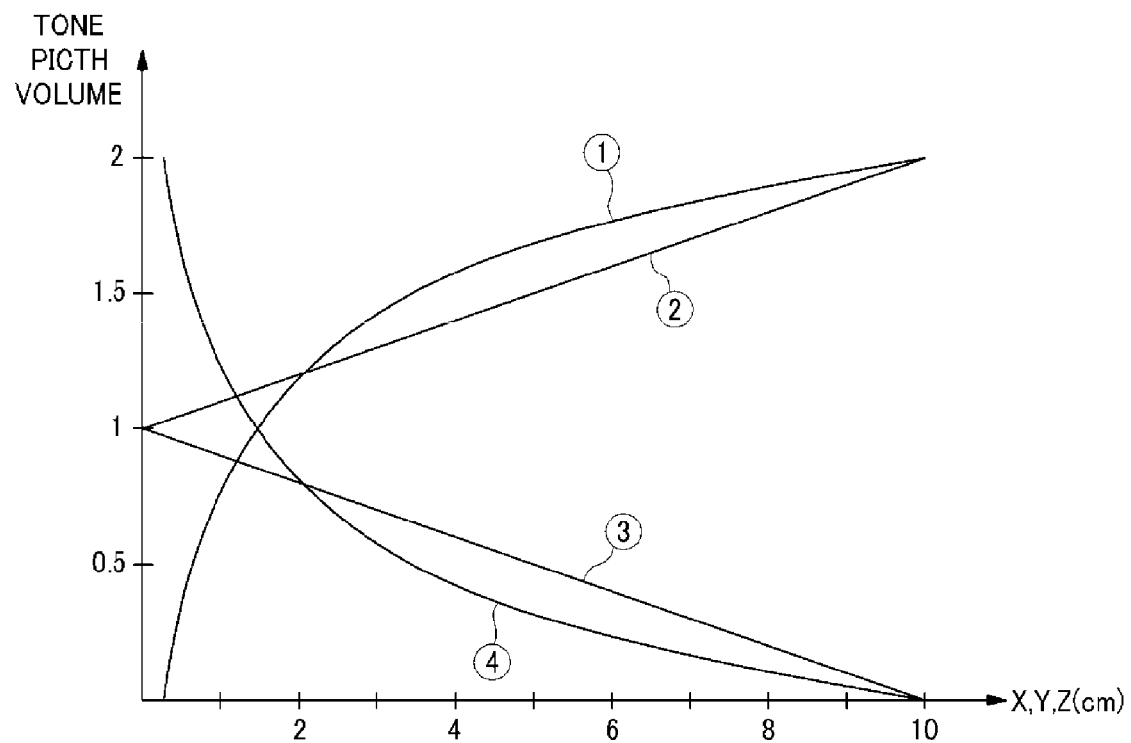
FIG. 7 shows illustrative examples of graphs of functional formulas included in a sound mapping table.

FIG. 7 shows illustrative examples of graphs of the functional formulas included in sound mapping table 600 shown in FIG. 6. As depicted in FIG. 7, an x axis of the graphs represents spatial attributes of a virtual object, and a y axis of the graphs indicates audio attributes of a sound file. Graph 1 of FIG. 7 is a graph of $1+\log 10(x)$; Graph 2 is a graph of $1+x/10$; Graph 3 is a graph of $1-x/10$; and Graph 4 is a graph of $1-\log 10(x)$. By way of example, $f_n(f_1(x), f_2(x), f_3(x), f_4(y), f_5(y), f_6(y), f_7(z), f_8(z)$ and $f_9(z))$ included in sound mapping table 600 may be any one of Graphs 1 to 4 in FIG. 7. Although it is described with reference to FIG. 7 that $f_n$ is any one of the Graphs 1 to 4, $f_n$ is not limited thereto.

FIG. 8 illustrates a sound mapping table 700 in accordance with at least some embodiments described herein. Sound mapping table 700 may include a lookup table showing the relationship between spatial attributes and audio attributes. Although it is illustrated in sound mapping table 700 that the x, y, and z coordinates of a virtual object correspond to the tone, pitch, and volume components of a sound file, respectively, correspondence between the x, y, and z coordinates and the tone, pitch, and volume components may not be limited thereto. Further, although the x, y, and z coordinates of a virtual object may be divided by a unit of centimeter (cm) in sound mapping table 700 shown in FIG. 8, the unit may not be limited thereto. That is, spatial attributes of a virtual object may be divided by a unit smaller than or larger than a cm.

Referring back to FIG. 1, first sound file repository 270 may include a first sound mapping table. When message processing unit 250 translates spatial attributes of a virtual object having an active message into audio attributes of a sound file, message processing unit 250 may use the first sound mapping table. By way of example, referring back to FIG. 4, when message processing unit 250 translates the spatial attributes of one of virtual objects 532 and 540 into the audio attributes of a corresponding sound file, message processing unit 250 may use the first sound mapping table.

Second sound file repository 280 may include a second sound mapping table. When message processing unit 250 translates spatial attributes of a virtual object related to a passive message into audio attributes of a sound file, message processing unit 250 may use the second sound mapping table. For example, referring back to FIG. 5, when message processing unit 250 translates the spatial attributes of one of virtual objects 531 and 538 into the audio attributes of a corresponding sound file, message processing unit 250 may use the second sound mapping table.

In FIG. 1, augmented reality module 200 may include first sound file repository 270 having a first sound mapping table for use when message processing unit 250 translates spatial attributes of a virtual object including an active message into audio attributes and second sound file repository 280 having a second sound mapping table for use when message processing unit 250 translates spatial attributes of a virtual object related to a passive message into audio attributes. However, it will be apparent to those skilled in the art that augmented reality module 200 may include a single sound file repository having a single sound mapping table commonly used when spatial attributes of a virtual object related to active messages and the spatial attributes of virtual objects 530 to 541 related to passive messages are translated into audio attributes.

Display unit 300 may display augmented reality image 520 and messages. By way of example, display unit 300 may display augmented reality image 520 and messages related to virtual objects 530 to 541 on augmented reality image 520. Further, display unit 300 may include a screen of a mobile device such as a Personal Digital Assistant (PDA), a smart phone, a cellular phone or a Portable Multimedia Player (PMP), a screen of a digital camera, a computer monitor, a screen of a notebook or tablet computer, or the like. Display unit 300 may receive a user input. For example, a user may input a user input or selection by touching, clicking or drag-and-dropping one or more of virtual objects 530 to 541 on augmented reality image 520 displayed on display unit 300.

Sound player 400 may play a sound file. As described herein, message processing unit 250 may translate spatial attributes of virtual objects 530 to 541 on augmented reality image 520 into audio attributes of one or more sound files. Sound player 400 may play such sound files including the audio attributes translated by message processing unit 250. Sound files may be included in the messages that are included in virtual objects 530 to 541. Therefore sound player 400 may play different sound files according to a location of virtual objects 530 to 541 that have the messages. For example, sound player 400 may play different sound files when the messages are delivered to a user.

In some embodiments, sound player 400 may compose the sound file including the tone, pitch, and volume components translated by message processing unit 250. By way of example, at least one basic sound file, that has basic tone, pitch, and volume components, may be stored in a separate repository. Further, sound player 400 may retrieve the basic sound file from the separate repository and adjust the basic tone, pitch, and volume components of the retrieved sound file according to the tone, pitch, and volume components translated by message processing unit 250 and play a sound file having the adjusted tone, pitch, and volume components.

In some embodiments, sound files may be stored in a separate database. For example, a multiple number of sound files, each of which has different tone, pitch and volume components, may be stored in a separate database. Sound player 400 may retrieve a sound file having the tone, pitch and volume components translated by message processing unit 250 from the separate database and play the retrieved sound file. Further, sound files related to active messages and sound files related to passive messages may be stored in different databases.

Play of the sound file by sound player 400 will be described in further detail with reference to FIGS. 4 and 5. By way of example, assume that a first spatial component, a second spatial component, and a third spatial component of a virtual object on augmented reality image 520 are an x-coordinate, a y-coordinate, and a z-coordinate, respectively. Further, assume that a first audio component, a second audio component, and a third audio component of a sound file are a tone component, a pitch component, and a volume component, respectively. Accordingly, message processing unit 250 translates the x-coordinate, the y-coordinate, and the z-coordinate into the tone component, the pitch component, and the volume component, respectively.

Referring to FIG. 4, virtual object 532 on augmented reality image 520 may have a smaller x-coordinate, a smaller y-coordinate, and a larger z-coordinate as compared to those of virtual object 540. Accordingly, a sound file related to virtual object 532 may have a lower tone component, a lower pitch component, and a larger volume component as compared to those of a sound file related to virtual object 5,40. For example, when display unit 300 displays an active message of virtual object 532 and an active message of virtual object 540, sound player 400 may play the sound files having the audio attributes corresponding to the spatial attributes of respective virtual objects 532 and 540. Since the sound file related to virtual object 532 has a lower tone component, a lower pitch component, and a larger volume component than those of the sound file related to virtual object 540, a user may be informed of a relative positional relationship between virtual objects 532 and 540 when he or she listens to the played sound files (that is, by the different tone, pitch and volume of the two sound files).

Referring to FIG. 5, virtual object 531 on augmented reality image 520 may have a smaller x-coordinate, a smaller z-coordinate, and the same y-coordinate as compared to those of virtual object 538. Accordingly, a sound file related to virtual object 531 may have a lower tone component, a smaller volume component, and the same pitch component as compared to those of a sound file related to virtual object 538. For example, when a passive message of virtual object 531 and a passive message of virtual object 538 are delivered to a user, sound player 400 may play the sound files having the audio attributes corresponding to the spatial attributes of respective virtual objects 531 and 538. Since the sound file related to virtual object 531 may have the lower tone component, the smaller volume component, and the same pitch component than those of the sound file related to virtual object 538, the user may be informed of a relative positional relationship between virtual objects 531 and 538 when he or she listens to the played sound files.

As described herein, message processing unit 250 may use the functional formulas included in sound mapping table 600 to translate spatial attributes of virtual objects 530 to 541 into audio attributes. By way of example, message processing unit 250 may use a functional formula corresponding to Graph 1 shown in FIG. 7 when it translates the x-coordinate, the y-coordinate, and the z-coordinate into the tone component, the pitch component, and the volume component, respectively. In such a case, since Graph 1 is a logarithmic function, the tone, pitch, and volume components may be varied greatly if the x-axis, y-axis, and z-axis coordinates change even slightly. Accordingly, sound files corresponding to respective virtual objects 530 to 541 may be distinguished clearly depending on the positions of virtual objects 530 to 541 on augmented reality image 520. Thus, while listening to the sound files, a user may distinguish relative positions between virtual objects 530 to 541 on augmented reality image 520 more easily. Furthermore, where sound files related to active messages are distinguished from sound files related to passive messages, a user may be informed of whether an active message is generated or a passive message is generate by listening to the sound files.

So far, it has been described that the spatial attribute of virtual objects 530 to 541 on augmented reality image 520 include first, second, and third spatial components, and the audio attributes of a sound file includes first, second, and third audio components. However, the spatial attributes of a virtual object on an augmented reality image may include only the first and second spatial components without having the third spatial component. Further, the audio attributes of a sound file may include only the first and second audio components without having the third audio component. By way of example, the first spatial component may be an x-coordinate of the virtual object, and a second spatial component may be a z-coordinate of the virtual object. Further, a first audio component may be a pitch component of the sound file, and a second audio component may be a volume component of the sound file.

Here, it will be apparent to those skilled in the art that a first spatial component may be a y-coordinate or a z-coordinate of the virtual object, a second spatial component may be a x-coordinate or a y-coordinate of the virtual object, a first audio component may be a tone component or a volume component of the sound file, and a second audio component may be a pitch component or a tone component of the sound file.

Message processing unit 250 may translate a first spatial component and a second spatial component into a first audio component and a second audio component, respectively. For example, message processing unit 250 may translate the x-coordinate of a virtual object into a pitch component of the sound file and the z-coordinate of a virtual object into a volume component of the sound file.

Sound player 400 may compose a sound file. By way of example, sound player 400 may compose a sound file having a pitch component and a volume component translated by message processing unit 250, a sound file having a tone component and a pitch component, and/or a sound file having a tone component and a volume component translated by message processing unit 250 and play the composed sound file.

Figure 9:
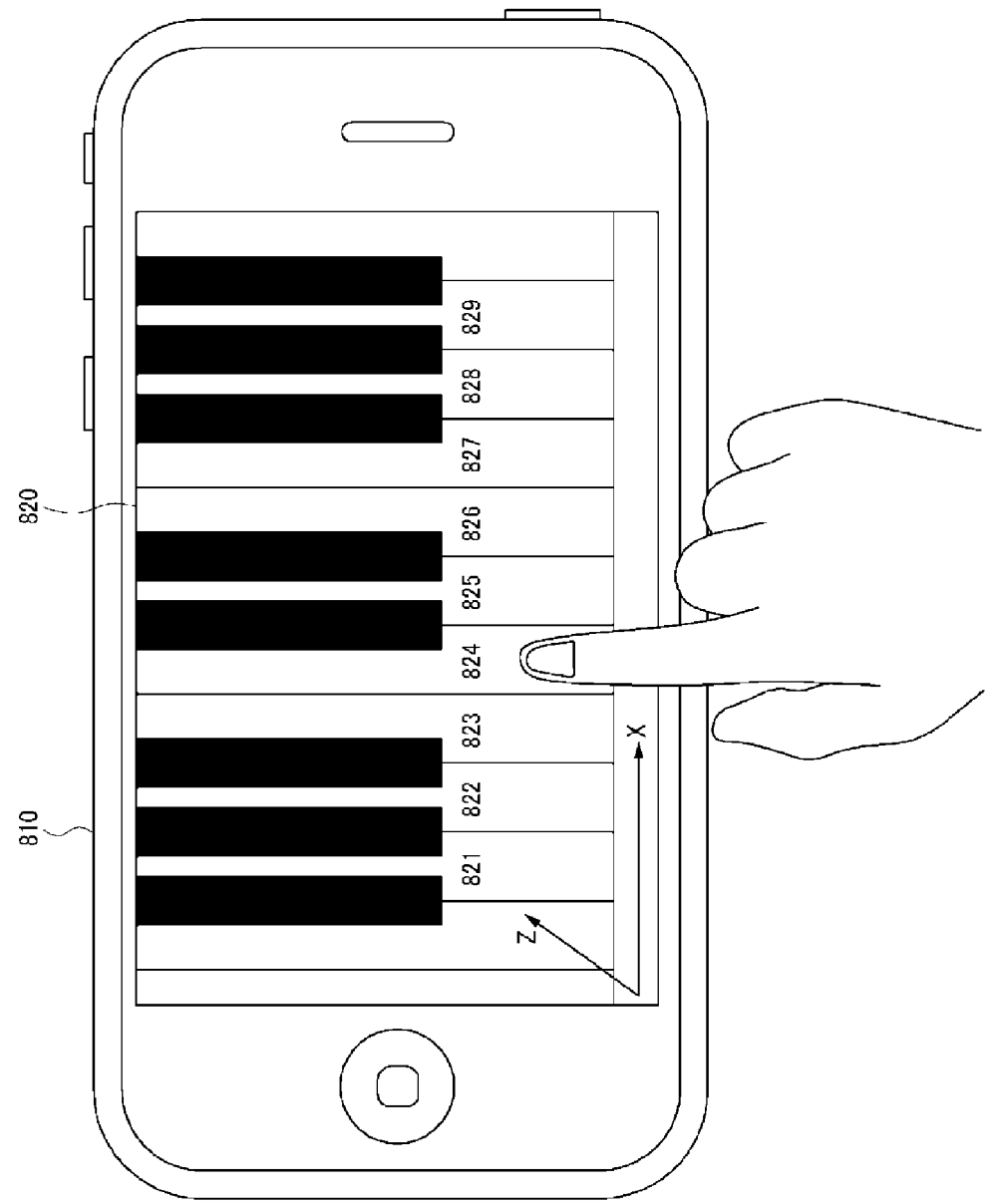
FIG. 9 shows an illustrative example of an augmented reality image generated by an augmented reality system.

FIG. 9 shows an illustrative example of an augmented reality image generated by an augmented reality system. An augmented reality image 820 may be displayed on a mobile device 810. Virtual objects 821 to 829 displayed on augmented reality image 820 may indicate piano keys. Each of virtual objects 821 to 829 may include spatial attributes. The spatial attributes of each of virtual objects 821 to 829 may include a first spatial component and a second spatial component. By way of example, the first spatial component may be an x-coordinate of each of virtual objects 821 to 829, and the second spatial component may be a z-coordinate of each of virtual objects 821 to 829. Here, the z-axis of augmented reality image 820 may indicate a depth direction in which virtual objects 821 to 829 are pressed down.

Message processing unit 250 may translate the first spatial component and the second spatial component of each of virtual objects 821 to 829 into a first audio component and a second audio component of a sound file. By way of example, the first audio component of the sound file may be a pitch component of the sound file and the second audio component may be a volume component of the sound file.

If a user inputs a user input to virtual objects 821 to 829, message processing unit 250 may translate the first and second spatial components of each of virtual objects 821 to 829 to which the user input is inputted into the first and second audio components of the sound file. Then, sound player 400 may play the sound file having the first and second audio components translated by message processing unit 250.

The x-coordinates of virtual objects 821 to 829 may increase from virtual object 821 to virtual object 829, and the sound files related to virtual objects 821 to 829 may have higher pitch components in the order of virtual objects 821 to 829. Further, as the z-coordinates of virtual objects 821 to 829 increase, their sound files may have larger volume components. By way of example, as the user presses down virtual objects 821 to 829 more strongly or for a longer period of time, the sound files may have larger volume components.

Figure 10:
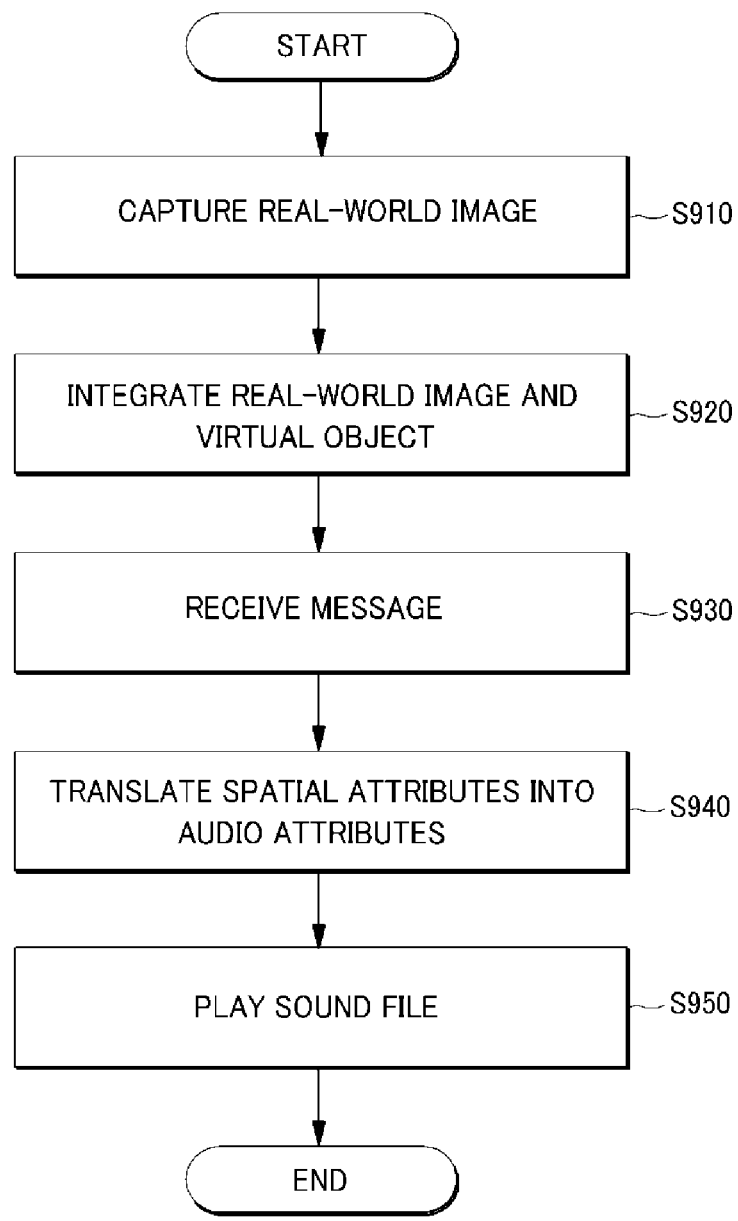
FIG. 10 shows a flow diagram of a method for playing a sound file related to a virtual object.

FIG. 10 shows a flow diagram of a method for playing a sound file related to a virtual object in accordance with at least some embodiments described herein. The method in FIG. 10 may be implemented using, for example, the augmented reality system discussed above. An example method may include one or more operations, actions, or functions as illustrated by one or more of blocks S910, S920, S930, S940 and/or S950. Although illustrated as discrete blocks, various blocks may be divided into additional blocks, combined into fewer blocks, or eliminated, depending on the desired implementation.

At block S910, the augmented reality system may be configured to capture one or more real-world images. The real-world image may show or depict various real objects such as buildings, trees, parks, subway stations, and so forth.

At block S920, the augmented reality system may be configured to provide an augmented reality image by integrating the real-world image captured at block S910 and one or more virtual objects. In the augmented reality image, a virtual object located closer to a user may be shown to be larger than a virtual object located farther from the user.

At block S930, the augmented reality system may be configured to receive a message related to a virtual object. As discussed herein, the message may include an active message and/or a passive message.

At block S940, the augmented reality system may be configured to translate spatial attributes of the virtual object into audio attributes of a sound file. The spatial attributes of the virtual object may include a first spatial component, a second spatial component, and a third spatial component. The audio attributes of the sound file may include a first audio component, a second audio component, and a third audio component.

By way of example, the first spatial component, the second spatial component, and the third spatial component of the virtual object may be an x-coordinate, a y-coordinate, and a z-coordinate of the virtual object, respectively. Further, the first audio component, the second audio component, and the third audio component of the sound file may be a tone component, a pitch component, and a volume component, respectively. However, it will be apparent to those skilled in the art that correspondence between the first, second, and third spatial components and the x, y, and z coordinates may be varied. Moreover, it is also apparent to those skilled in the art that correspondence between the first, second, and third audio components and the tone, pitch, and volume components may be varied as well.

At block S940, the augmented reality system may be configured to translate the first, second, and third spatial components into the first, second, and third audio components respectively by using a sound mapping table. By way of example, the augmented reality system may translate the x, y, and z coordinates of the virtual object into the tone, pitch, and volume components of the sound file, respectively.

At block S950, the augmented reality system may be configured to play the sound file having the audio attributes translated at block S940. By way of example, if a user touches a virtual object on an augmented reality image or if a virtual object has associated with it an active message, the spatial attributes of the virtual object may be translated into audio attributes of a sound file, and the augmented reality system may play the sound file having the translated audio attributes.

In some embodiments, at blocks S930 to S950, the augmented reality system may be configured to process a virtual object having a passive message after processing a virtual object having an active message. However, the translation sequence is not limited to the above, and the augmented reality system may be configured to process the virtual object having the passive message before processing the virtual object having the active message. Further, the augmented reality system may be configured to process virtual objects according to a sequence in which messages are generated.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems. It is also to be understood that the terminology used herein is for the purpose of describing particular embodiments only, and is not intended to be limiting.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An augmented reality system comprising:
    a memory comprising instructions; and
    an augmented reality engine coupled to the memory, the augmented reality engine executable by a processor and configured to provide an augmented reality image by integrating a real-world image and a virtual object; and
    a message processing unit coupled to the memory, the message processing unit executable by the processor and configured to:
    receive an x-axis spatial component, a y-axis spatial component, and a z-axis spatial component for the virtual object;
    determine a tone audio component based on the x-axis spatial component;
    determine a pitch audio component based on the y-axis spatial component;
    determine a volume audio component based on the z-axis spatial component; and
    compose a sound file associated with the virtual object, the sound file comprising the tone audio component, the pitch audio component, and the volume audio component.

2. The augmented reality system of claim 1, further comprising a sound player executable by the processor, the sound player configured to play the sound file.

3. The augmented reality system of claim 1, further comprising a user recognition unit executable by the processor and configured to detect a user input and, in response, transmit a message comprising the x-axis spatial component, the y-axis spatial component, and the z-axis spatial component for the virtual object.

4. The augmented reality system of claim 3, wherein the user input is a selection of the virtual object.

5. The augmented reality system of claim 1, wherein the x-axis spatial component, the y-axis spatial component, and the z-axis spatial component are received in a message associated with the virtual object.

6. The augmented reality system of claim 5, wherein the message comprises an active message automatically generated by the virtual object.

7. The augmented reality system of claim 5, wherein the message comprises a passive message generated in response to a user selection of the virtual object.

8. The augmented reality system of claim 1, further comprising:
    a first sound file repository configured to store a first sound mapping table; and
    a second sound file repository configured to store a second sound mapping table,
    wherein the x-axis spatial component, the y-axis spatial component, and the z-axis spatial component are received in a message associated with the virtual object,
    wherein the message comprises an active message automatically generated by the virtual object and a passive message generated in response to a user selection of the virtual object,
    wherein the sound file is associated with the active message,
    wherein the message processing unit is further configured to use the first sound mapping table to determine the tone audio component based on the x-axis spatial component, the pitch audio component based on the y-axis spatial component, and the volume audio component based on the z-axis spatial component, and
    wherein the message processing unit is further configured to:
    use the second sound mapping table to determine a second tone audio component based on the x-axis spatial component, a second pitch audio component based on the y-axis spatial component, and a second volume audio component based on the z-axis spatial component, and
    compose a second sound file associated with the passive message, the second sound file comprising the second tone audio component, the second pitch audio component, and the second volume audio component.

9. The augmented reality system of claim 1, further comprising:
    a sound file repository configured to store a sound mapping table,
    wherein the message processing unit is further configured to use the sound mapping table to determine the tone audio component based on the x-axis spatial component, the pitch audio component based on the y-axis spatial component, and the volume audio component based on the z-axis spatial component.

10. The augmented reality system of claim 9, wherein the sound mapping table comprises a functional formula showing a relationship between at least one of the x-axis spatial component, the y-axis spatial component, and the z-axis spatial component and at least one of the tone audio component, the pitch audio component, and the volume audio component.

11. The augmented reality system of claim 1, further comprising:
 a depth recognition unit executable by the processor and configured to recognize spatial attributes of the real-world image; and
 a distance calculation unit executable by the processor and configured to calculate a distance between a user and the virtual object based on the spatial attributes of the real-world image.

12. The augmented reality system of claim 1, further comprising:
 a display unit configured to display the augmented reality image.

13. The augmented reality system of claim 1, further comprising:
 a user recognition unit executable by the processor and configured to recognize a user's behavior captured by an image capture unit.

14. A method performed under the control of an augmented reality system, the method comprising:
 generating, by a computer processor, an augmented reality image using an augmented reality engine by integrating a real-world image and a virtual object;
 receiving, by the computer processor, an x-axis spatial component, a y-axis spatial component, and a z-axis spatial component for the virtual object;
 determining, by the computer processor, a tone audio component based on the x-axis spatial component;
 determining, by the computer processor, a pitch audio component based on the y-axis spatial component;
 determining, by the computer processor, a volume audio component based on the z-axis spatial component; and
 composing, by the computer processor, a sound file associated with the virtual object, the sound file comprising the tone audio component, the pitch audio component, and the volume audio component.

15. The method of claim 14, further comprising playing the sound file.

16. The method of claim 14, wherein the x-axis spatial component, the y-axis spatial component, and the z-axis spatial component are received in a message associated with the virtual object.

17. The method of claim 16, wherein the message comprises at least one of an active message automatically generated by the virtual object or a passive message generated in response to a user selection of the virtual object.

18. The method of claim 14, wherein a sound mapping table is used to determine the tone audio component based on the x-axis spatial component, the pitch audio component based on the y-axis spatial component, and the volume audio component based on the z-axis spatial component.

19. A non-transitory computer-readable storage medium whose contents cause a processor to:
 generate, using an augmented reality engine, an augmented reality image by integrating a real-world image and a virtual object;
 receive an x-axis spatial component, a y-axis spatial component, and a z-axis spatial component for the virtual object;
 determine a tone audio component based on the x-axis spatial component;
 determine a pitch audio component based on the y-axis spatial component;
 determine a volume audio component based on the z-axis spatial component; and
 compose a sound file associated with the virtual object, the sound file comprising the tone audio component, the pitch audio component, and the volume audio component.

20. The non-transitory computer-readable storage medium of claim 19, wherein the contents further cause the processor to play the sound file.

21. The non-transitory computer-readable storage medium of claim 19, wherein the x-axis spatial component, the y-axis spatial component, and the z-axis spatial component are received in a message associated with the virtual object.

22. The non-transitory computer-readable storage medium of claim 21, wherein the message comprises at least one of an active message automatically generated by the virtual object or a passive message generated in response to a user selection of the virtual object.

23. The non-transitory computer-readable storage medium of claim 19, wherein the contents further cause the processor to use a sound mapping table to determine the tone audio component based on the x-axis spatial component, the pitch audio component based on the y-axis spatial component, and the volume audio component based on the z-axis spatial component.

* * * * *